United States Patent
Laaksonen et al.

(10) Patent No.: US 10,602,296 B2
(45) Date of Patent: Mar. 24, 2020

(54) AUDIO OBJECT ADJUSTMENT FOR PHASE COMPENSATION IN 6 DEGREES OF FREEDOM AUDIO

(71) Applicant: Nokia Technologies Oy, Espoo (FI)

(72) Inventors: Lasse Juhani Laaksonen, Tampere (FI); Anssi Sakari Ramo, Tampere (FI); Jussi Artturi Leppanen, Tampere (FI); Arto Juhani Lehtiniemi, Lempaala (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 15/618,307

(22) Filed: Jun. 9, 2017

(65) Prior Publication Data
US 2018/0359592 A1 Dec. 13, 2018

(51) Int. Cl.
*H04S 7/00* (2006.01)
*H04S 3/00* (2006.01)
(Continued)

(52) U.S. Cl.
CPC ............. *H04S 7/303* (2013.01); *H04S 3/008* (2013.01); *A63F 13/212* (2014.09); *A63F 13/25* (2014.09); *A63F 13/54* (2014.09); *G02B 2027/014* (2013.01); *G06F 3/165* (2013.01); *G06T 15/80* (2013.01); *G10L 15/22* (2013.01);
(Continued)

(58) Field of Classification Search
CPC ...... H04S 3/008; H04S 7/303; H04S 2400/01; H04S 7/301; H04S 2420/03; H04S 2400/11; H04S 1/002; H04R 2205/00; G06F 3/165; G06F 3/04842; G02B 2027/014; G02B 27/0172; A63F 13/25; A63F 13/212;
(Continued)

(56) References Cited

U.S. PATENT DOCUMENTS 4,890,065 A * 12/1989 Laletin ................. H04B 1/1646
327/233
5,121,433 A * 6/1992 Kendall .................... H04S 5/00
381/1

(Continued)

OTHER PUBLICATIONS

Galvez, Listener tracking Stereo for Object based Audio Reproduction, Techni Acoustica, 2015.*
(Continued)

*Primary Examiner* — Davetta W Goins
*Assistant Examiner* — Kuassi A Ganmavo
(74) *Attorney, Agent, or Firm* — Harrington & Smith (57) ABSTRACT

Phase effect interference is determined at a listening location between signals from at least two audio objects; and a modified position is computed for at least one of the audio objects such that the determined phase effect interference at the listening location is altered as a result of the modified position. For each audio object for which the position is modified at least phase of at least one frequency component of the respective signal is adjusted in correspondence with the modified position so as to eliminate the determined phase effect interference. The signals from the at least two audio objects are formed after this adjusting; and then the formed signals are provided to a sound system comprising multiple audio transducers so as to render the formed signals at the listening position where the phase effect interference is eliminated during rendering.

20 Claims, 7 Drawing Sheets

(51) Int. Cl.
*G02B 27/01* (2006.01)
*A63F 13/212* (2014.01)
*A63F 13/54* (2014.01)
*G06F 3/16* (2006.01)
*G10L 15/22* (2006.01)
*G06T 15/80* (2011.01)
*A63F 13/25* (2014.01)

(52) U.S. Cl.
CPC ..... *G10L 2015/223* (2013.01); *H04S 2400/01* (2013.01); *H04S 2400/11* (2013.01)

(58) Field of Classification Search
CPC ... A63F 13/54; G10L 15/22; G10L 2015/223; G06T 15/80
See application file for complete search history.

(56) References Cited

U.S. PATENT DOCUMENTS

| | | | | |
|---|---|---|---|---|
| 6,144,747 | A * | 11/2000 | Scofield | H04S 3/004 381/309 |
| 6,307,941 | B1 | 10/2001 | Tanner, Jr. et al. | |
| 6,771,778 | B2 * | 8/2004 | Kirkeby | H04S 1/005 381/1 |
| 8,073,160 | B1 * | 12/2011 | Classen | G11B 27/34 381/119 |
| 9,111,522 | B1 | 8/2015 | Worley, III | |
| 9,154,897 | B2 | 10/2015 | Kraemer et al. | |
| 9,271,080 | B2 | 2/2016 | Mahabub et al. | |
| 9,332,370 | B2 | 5/2016 | Zajac et al. | |
| 9,396,731 | B2 | 7/2016 | Herre et al. | |
| 2004/0111171 | A1 * | 6/2004 | Jang | H04S 7/30 700/94 |
| 2007/0101249 | A1 * | 5/2007 | Lee | H04S 7/30 715/203 |
| 2009/0208022 | A1 * | 8/2009 | Fukui | H04S 1/005 381/17 |
| 2009/0326960 | A1 * | 12/2009 | Breebaat | G10L 19/20 704/500 |
| 2011/0116638 | A1 * | 5/2011 | Son | H04S 3/008 381/1 |
| 2014/0064550 | A1 * | 3/2014 | Wiggins | H04R 1/023 381/391 |
| 2015/0350802 | A1 * | 12/2015 | Jo | H04S 5/005 381/1 |
| 2016/0330548 | A1 | 11/2016 | Yen et al. | |
| 2016/0330560 | A1 * | 11/2016 | Chon | H04S 5/005 |
| 2017/0160798 | A1 * | 6/2017 | Lanman | G06F 3/013 |

OTHER PUBLICATIONS

Merchel et al, Adaptively adjusting the stereophonic sweet spot to the listener position, AES, 2010.*

Choisel et al, Audibility of phase response differences in a stereo playback system part 2 Narrow stimuli in headphones and loudspeaker, AES, 2008.*

Lentz et al, Virtual reality System with integrated sound field simulation and reproduction, EURASIP, 2007.*

Mouchtaris, Athanasios, et al., "Inverse Filter Design for Immersive Audio Rendering Over Loudspeakers", IEEE Transactions on Multimedia, vol. 2, No. 2, Jun. 2000, pp. 77-87.

* cited by examiner

AUDIO OBJECT ADJUSTMENT FOR PHASE COMPENSATION IN 6 DEGREES OF FREEDOM AUDIO

TECHNOLOGICAL FIELD

The described invention relates to compensating phase cancellation in complex audio environments such an augmented reality audio or free viewpoint audio with six degrees of freedom.

BACKGROUND

Virtual reality (VR) is a well-known technical area and generally refers to various capture and rendering technologies for generating realistic images and sounds that replicate a real or imaginary environment, and simulate a user's physical presence in this environment. Virtual reality may be considered as a content consumption space. In a three dimensional (3D) space there are six degrees of freedom defining the way the user may move within that 3D space. Often researchers divide this movement into two categories: rotational movement and translational movement, where each category of movement has three degrees of freedom in the space. Rotational movement is often sufficient for a simple VR experience where the user may turn her head (pitch, yaw, and roll) to experience the space from a static or automatically moving point. Translational movement means that the user may also change the position of the rendering, that is, the user moves along the x, y, and z axes of a Cartesian system. Augmented reality (AR) shares many similarities with VR. Typically it refers to a direct or indirect view of a physical, real-world environment to which computer-generated sensory input such as sound and graphics is added. Embodiments of these teachings relate to rendering of six-degrees-of-freedom (6 DoF) audio, which is also known as free-viewpoint or free-listening point audio. Certain use cases for AR/VR audio allow for user movement that is at least substantially free and where at least the audio is rendered to the user according to the user's head rotation as well as location in the audio content space. This spatial audio may for example consist of a channel-based bed and audio objects, audio objects only, or similar spatial audio representation. The audio objects may be static or they may be dynamic in the sense that their default location in the 3D space may be time-variant.

Phase cancellation is a known problem in various audio applications ranging from capture and recording, through mixing, to audio presentation. For example, when considering a phase problem in stereo loudspeaker presentation, phase cancellation typically manifests itself in the low-frequency sounds that appear thin with little or no bass sound. As another example, a bass guitar in a musical piece may lack localization, and the sound object rendered as an audio object may appear to be moving rather than emitting sound from a virtual single point in Cartesian space. Considering loudspeaker presentation, audio content from music to movies is typically mixed such that the audio sound is optimized for some "sweet spot", which typically is adapted some such that not only a single listening (seat) position is optimized but rather a reasonably good sound quality is achieved for a target listening area that may for example span several seat positions.

Figure 1A:
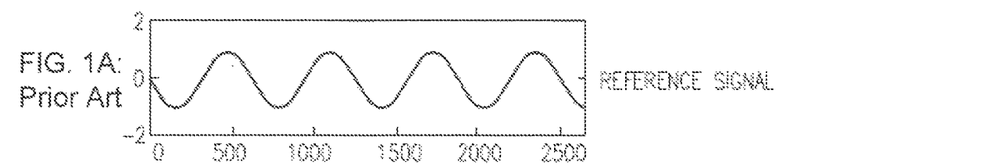
Figure 1B:
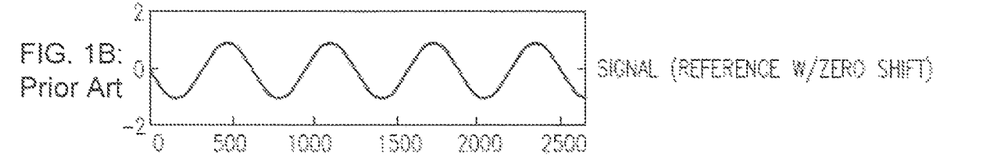
FIGS. 1B-G illustrate various effects of phase shifts and phase interference with respect to a simple reference wave shown at FIG. 1A, as known in the art.
Figure 1C:
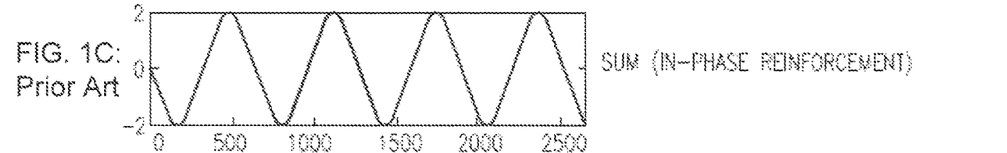
Figure 1D:
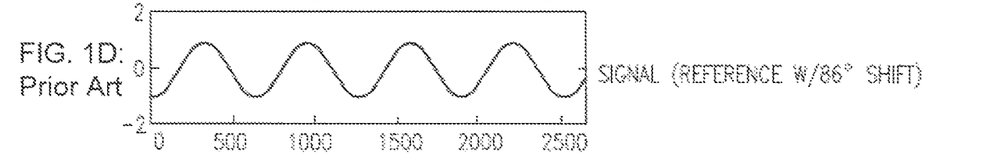
Figure 1E:
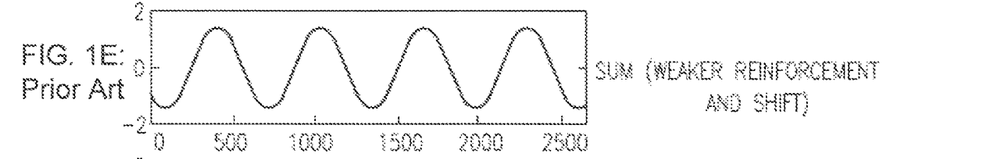
Figure 1F:
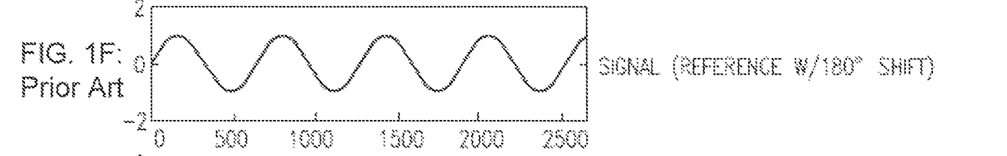
Figure 1G:
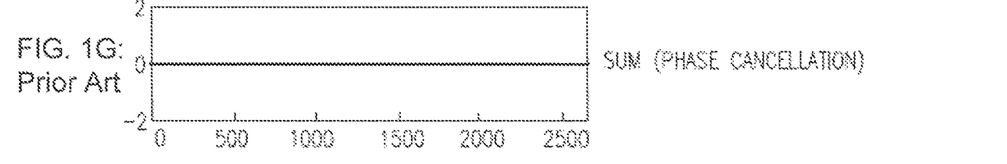

FIGS. 1B through 1G illustrate various effects of phase addition/cancellation to a simple reference wave shown at FIG. 1A, as known in the art. FIG. 1A illustrates the reference signal; FIGS. 1B, 1D and 1F each present a non-shifted (1B) or shifted (1D, 1F) version of that reference signal where the specific shifts are indicated in the figure. The combined signals of FIG. 1C, 1E and 1G are achieved by summing the reference signal of FIG. 1A with the respective second signals of FIGS. 1B, 1D and 1F, respectively. FIG. 1C illustrates the reinforcing effect of summing in-phase signals, while FIG. 1E illustrates that a considerable shift may have a fairly small effect. FIG. 1G illustrates the case of exact phase cancellation due to summing the reference signal with a 180° shifted version of itself.

Six degrees of freedom audio such as AR/VR audio may often suffer from unwanted phase cancellation effects due to the nature of the audio that is used for the productions as well as the nature of the use case itself. Freedom of the user means less control by the content creator over unwanted phase additions/cancellations. Embodiments of these teachings provide a method and apparatus to gain back some of that control that is lost in the 6 degrees of freedom environment.

Some prior art teachings that have some background relevance can be seen at U.S. Pat. Nos. 9,271,080; 9,332,370; 9,332,370; 9,111,522; 9,396,731; 9,154,897; 6,307,941; US patent publication no. 2016/0330548; and a paper entitled INVERSE FILTER DESIGN FOR IMMERSIVE AUDIO RENDERING OVER LOUDSPEAKERS by A. Mouchtaris, et al. (IEEE Transactions on Multimedia; June 2000).

SUMMARY

According to a first aspect of these teachings there is a method comprising determining phase effect interference at a listening location between signals from at least two audio objects; computing a modified position for at least one of the audio objects such that the determined phase effect interference at the listening location is altered as a result of the modified position; and for each audio object for which the position is modified adjusting at least phase of at least one frequency component of the respective signal in correspondence with the modified position so as to eliminate the determined phase effect interference. The signals from the at least two audio objects are formed after the adjusting; and then the formed signals are provided to a sound system comprising multiple audio transducers so as to render the formed signals at the listening position where the phase effect interference is eliminated during rendering.

According to a second aspect of these teachings there is an audio processing system comprising at least one memory storing computer program instructions and at least one processor. In this regard the at least one memory with the computer program instructions is configured with the at least one processor to cause the audio processing system to perform actions comprising: determine phase effect interference at a listening location between signals from at least two audio objects; compute a modified position for at least one of the audio objects such that the determined phase effect interference at the listening location is altered as a result of the modified position; and for each audio object for which the position is modified adjust at least phase of at least one frequency component of the respective signal in correspondence with the modified position so as to eliminate the determined phase effect interference. The actions further include form the signals from the at least two audio objects after the adjusting; and provide the formed signals to a sound system comprising multiple audio transducers so as to render the formed signals at the listening position where the phase effect interference is eliminated during rendering.

According to a third aspect of these teachings there is a computer readable memory tangibly storing computer program instructions that, when executed by one or more processors, cause a host audio system to perform actions. These actions include: determine phase effect interference at a listening location between signals from at least two audio objects; compute a modified position for at least one of the audio objects such that the determined phase effect interference at the listening location is altered as a result of the modified position; for each audio object for which the position is modified, adjust at least phase of at least one frequency component of the respective signal in correspondence with the modified position so as to eliminate the determined phase effect interference; form the signals from the at least two audio objects after the adjusting; and provide the formed signals to a sound system comprising multiple audio transducers so as to render the formed signals at the listening position where the phase effect interference is eliminated during rendering.

In another aspect of these teachings the is a method, and/or an audio processing system, and/or a computer readable memory, in which phase effect interference is determined at a listening location between two signals from two dominant sound sources; and a modified position for at least one of the dominant sound sources is computed such that the determined phase effect interference at the listening location is altered as a result of the modified position. In this aspect, for each dominant sound source for which the position is modified there is an adjustment of at least one frequency component of the respective signal in correspondence with the modified position so as to eliminate the determined phase effect interference. The signals from the at least two dominant sound sources are formed after the adjusting; and then the formed signals are provided to a sound reproduction system (where this sound reproduction system comprises multiple audio transducers) so as to render the formed signals at the listening position where the phase effect interference is eliminated during rendering.

These and other aspects are detailed further below with particularity.

DETAILED DESCRIPTION

Embodiments of these teachings relate to six degrees of freedom audio, and the scene in which this occurs can be very rich for example with many audio objects such as individual musical instruments and background music, or the audio scene may be very sparse for example with only a few audio objects. Typically, a large scene may have some parts with rich audio and other parts with sparse audio, and this may result from both artistic and technical considerations. For example, a very rich audio in a large scene requires a considerably high total bit rate dedicated to audio.

In general an audio object may be considered as what the user perceives audibly as one distinct sound object, so for example if the audio environment is a pet store there may be background sound for which the various different sounds are non-distinguishable as one distinct audio object and over that background there is another audio object for birds in a cage to the user's near left, another audio object for a dog barking to the user's distant front, and a fourth audio object is a person talking to the user and located behind the user. The manner in which these audio objects are presented over time mimics movement, so for example if the user walks forward and the person behind him follows, the bird and dog sound objects will be presented to reflect that user movement audibly which in this example would be an audible presentation of the user moving further from the birds and closer to the dog while staying roughly an equal distance from the other person talking. The concept of audio objects are known in the audio arts.

Any two completely separate audio objects, for example the recording of a car engine running and a goose honking, are seldom created equal and they therefore will generally not create very disturbing phase interactions in the presentation. However, much audio content is created in studios and content creators will often use both their own captured objects, such as dialogue of main characters or specific room ambiances, in creative ways and also add various catalogue sounds from audio databases to the audio scenes. As one example of this, a single mono object may be duplicated into a stereo object with minor differences between the two channels, a certain audio component such as a low-frequency rumble may be presented from more than one direction so it is perceived as part of more than one audio object and in a larger area of the 6 degree of freedom audio space to enhance the feeling of immersiveness, and signal waveforms may be rearranged (in a kind of cut and paste process) to create more than one different audio object based on a single recording or audio sample where at least a part of the audio may be the same at the same time. In addition, certain specially generated audio signals may have fairly pronounced bandlimited frequency components as opposed to audio content covering a large range of frequencies.

A high-quality binaural presentation of the 6 degrees of freedom audio space to the user may consider direct sounds only with the correct time of travel from the given audio object to the user, and in some cases there may be at least one reflection based on a room geometry modeling. Computational complexity increases with the complexity of the room acoustics that are considered for presentation of each audio object. In some use cases the user may also experience the content via loudspeaker presentation, for example in a dedicated 6 degree of freedom listening room.

Summarizing, the 6 degree of freedom audio scene may at times consist of only a limited number of audio objects, where at least a part of the audio may be substantially the same at a given time. Presentation of such an audio scene to a user may be via binaural headphones (with head tracking to complete all 6 degrees of freedom), or it may be via loudspeakers where the user position may also be tracked. Modeling of acoustics may or may not be used, but where it is such modeling can be simple such as accounting for first acoustic reflections only, or it may be more complex.

Figure 2:
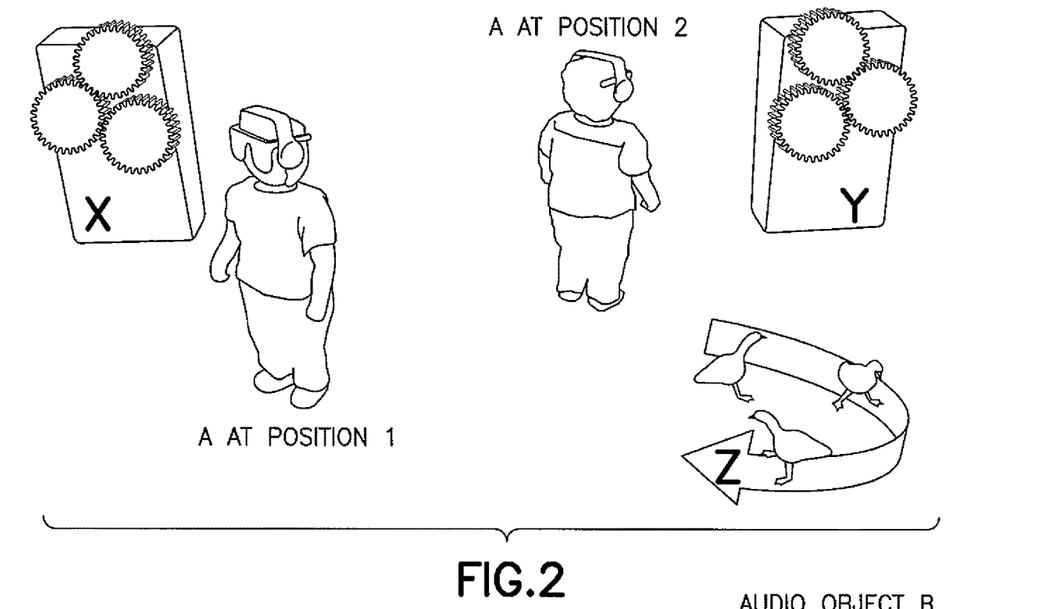
FIG. 2 is a conceptual diagram showing a user with six degrees of freedom in an audio environment that includes two fixed audio objects A and Y and one dynamic/moving audio object Z.

FIG. 2 illustrates a user A in a 6 degrees of freedom audio experience in a relatively simple audio scene. There is a single dynamic (movable) audio object Z with mostly mid- and high-frequency content and two audio objects X and Y that both have a static position and very similar audio consisting mostly of low-frequency content such as machinery noises. The user A observes the scene from different positions 1 and 2 at FIG. 2. There are several positions the user may be at which phase cancellation occurs. Such phase cancellation may be particularly disadvantageous from an audio perspective for two reasons; first, the audio objects for which phase cancellation occur may have their main contribution at the cancelled frequencies such as illustrated at FIG. 1G (even if there is less than exact cancellation), and secondly the nature of 6 degrees of freedom usage and audio rendering means that the user may easily experience slightly different positions (for example as the user moves in a back and forth pattern) at which the phase cancellation effect may switch from one important frequency component to another (for example, switching between attenuating the frequency of machine/object X and Y at the different positions) or it may simply oscillate on and off (for example, switching between FIG. 1C when the user is at position 1 and FIG. 1G when the user is at position 2). In this case the user audio experience may be quite degraded, and free user movement may further trigger the same annoying effect at multiple other positions.

Such phase cancellations and additions are inherent in the fact that the user in a 6 degree of freedom audio environment is free to move about that environment, and the sound waves from the different objects will combine or attenuate differently at different locations.

Phase cancellation is often exploited in use cases relating to audio presentation directly to user's ear, for example with hearing aids or noise canceling headphones in which certain feedback is suppressed using a phase cancellation technique. Prior to active noise cancellation that goal was achieved, though less effectively, using gain reduction with notch filters. These techniques are not suitable for addressing phase interactions in a six degree of freedom audio environment for reasons stated above; the phase interactions from multiple audio objects or objects are different at the different positions to which the user might move.

Embodiments of these teachings are directed to modifying six degree of freedom spatial audio. More specifically, a phase effect for dominant audio objects is estimated, and a temporary (virtual audio) position of at least one contributing sound object for at least one audio rendering is adjusted, in order to cancel an adverse phase effect among those dominant audio objects. The system implementing these teachings may estimate the severity of phase cancellation (or other effect) for each audio object pair being rendered to the user. It may thus evaluate the importance of frequency components of the audio objects, and detect the components that require correction due to current, or likely upcoming, phase effects due to current user position or predicted user position where the prediction is based at least on user movement and in some embodiments also on understanding of the scene.

The phase cancellation effect is removed from a given audio rendering by temporarily adjusting the position of at least one contributing audio object relative to the user position at the time of that rendering. The user experience is improved when the user no longer perceives in the audio rendering some or all of the unwanted phase effects. In other words, the system operates such that the temporary distance adjustments of the audio objects are not perceived by the user, except via the absence of unwanted phase effects that the user would generally not be aware were avoided.

Phase is the position of a time instant of a wave. The interval from peak to peak or trough to trough of a wave is the wavelength. One cycle of a given wave constitutes 360° of phase. It follows then that a phase shift of 180° between two waves result in a phase cancellation. FIG. 1G illustrates such phase cancellation in that it results from interfering the reference wave of FIG. 1A with its 180° shifted version at FIG. 1F.

Human hearing range is commonly given as 20 Hz to 20 kHz though there is considerable variation between individuals who are the users in this description. This is also a typical range referenced for high-quality audio presentations such as in the technical specifications for loudspeakers and headphones. The wavelength for sound in air is about 17 meters at 20 Hz, and about 1.7 centimeters at 20 KHz. Considering human hearing and typical user movement in a 6 degrees of freedom audio environment, it is reasonable to limit the frequency range of interest to about 1000 Hz and below, equivalent to wavelengths of about 34 cm and above.

At frequencies below about 1000 Hz, human hearing evaluates mainly interaural time differences (ITD) or phase delays. At frequencies above 1500 Hz human hearing mainly considers interaural intensity differences (IID). In the transition range between 1000 and 1500 Hz, both elements are typically considered. Based on this the teachings herein are suitable for frequencies above 1000 Hz (wavelengths below 34 cm). But adjustments become more difficult as wavelengths (and distances) become very small. Combined with the fact that phase cancellation effects are generally noticeable to humans at lower frequencies, phase effects at the higher frequencies are discounted and not compensated in the examples below.

Assuming an ear-to-ear distance of about 21 cm for the human head, frequencies below about 800 Hz correspond to an interaural time delay of about 625 µs (0.000625 s). This is smaller than half of the wavelength of the sound waves. This means that below 800 Hz the human auditory system is able to determine phase delays between the ears without confusion. The localization accuracy of the human auditory system is about 1° for objects that are virtually in front of the listener and about 15° for objects that are virtually located to the sides. In general, humans can perceive interaural time delays of 10 µs (0.00001 s) or less.

Phase cancellation may occur as the user is moving freely in the 6 degree of freedom listening space. Particularly when that listening space has only a small number of audio objects with bandlimited content, this phase cancellation may seriously degrade the audio experience, and it may be that the user may inadvertently trigger that adverse effect repeatedly and in various different ways due to the user's own movement about the listening space. Embodiments of these teachings address this with a phase effect estimation and control system that utilizes temporarily movement of at least one individual sound object for at least one audio rendering in the 6 degrees of freedom audio so as to cancel that adverse phase effect. In a particular embodiment the system estimates the severity of the phase cancellation (or other effect) for each audio object or audio object pair. Doing so enables the system to evaluate the importance of frequency components of the various audio objects, and to detect the frequency components that will require correction due to current (ongoing) or upcoming (estimated) phase effects. The phase cancellation effect deemed to be sufficiently adverse is removed by temporarily adjusting the position of at least one contributing audio object relative to the user rendering position, in at least one rendering of the 6 degree of freedom audio.

Figure 3:
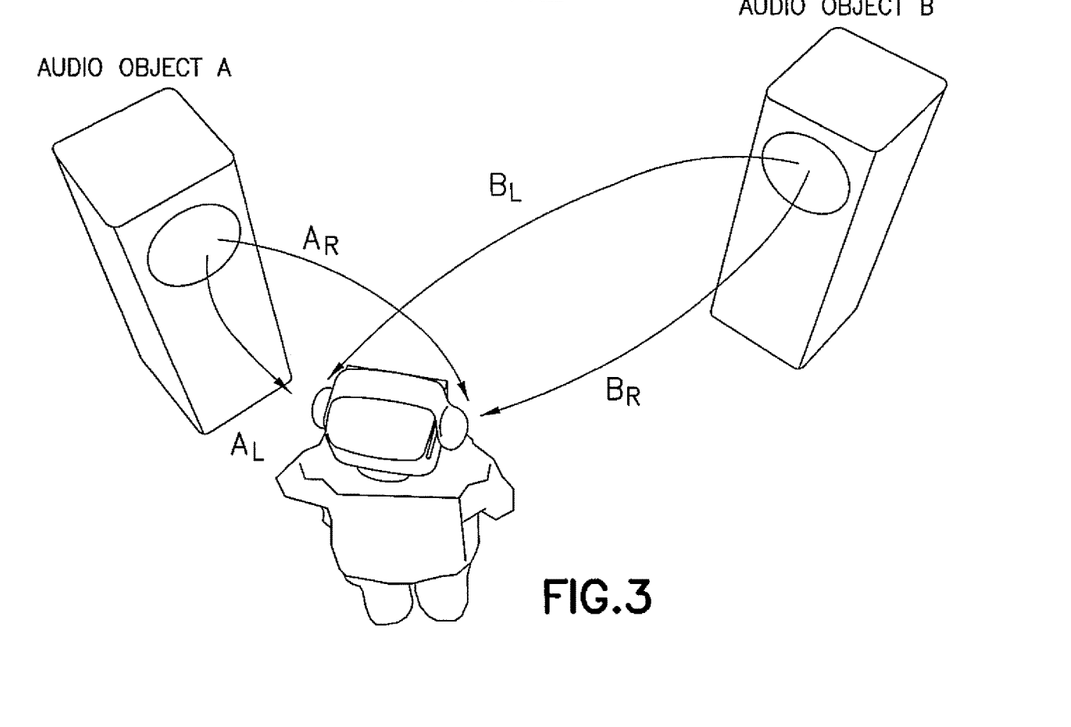
FIG. 3 is a conceptual diagram with a user in a six degree of freedom audio environment that includes two audio objects A and B at respective virtual positions in space as presented audibly via head-tracked headphones.
Figure 4:
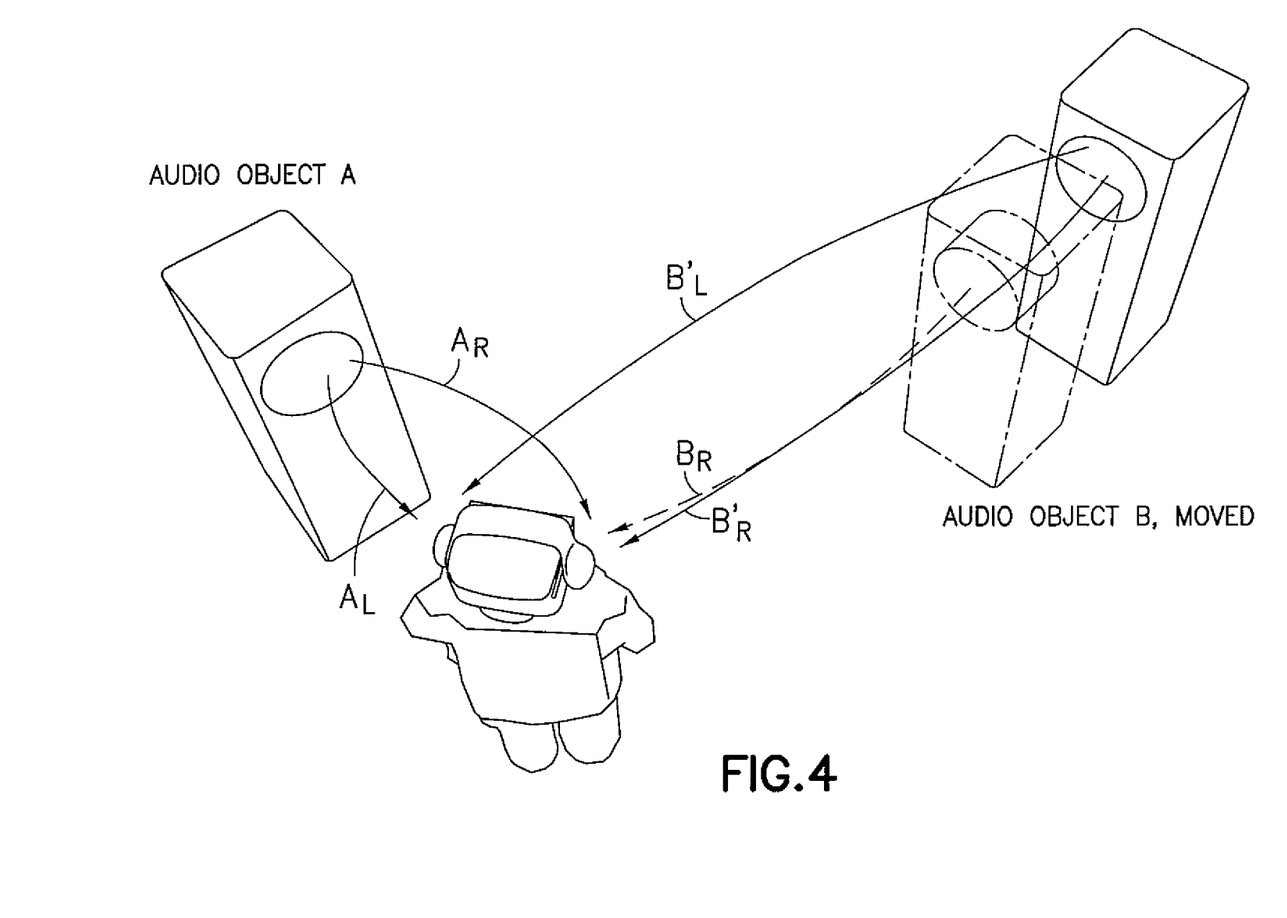
FIG. 4 is similar to FIG. 3 but showing 1 movement of the virtual position of audio object B to alter phase interactions at the user's location, according to embodiments of these teachings.

FIGS. 3 and 4 illustrate the principle of operation of such a system. FIG. 3 illustrates audio presentation of two virtual audio objects A and B to a user in a 6 degree of freedom audiovisual experience where the user is wearing a head-mounted display (HMD) system with headtracked headphones. The audio objects may be static or dynamic, and FIGS. 3-4 illustrate the location relative to the user of the audio objects A and B at a given moment in time as the illustrated loudspeakers. So for example if audio object A is a creaking branch and audio object B is a distant wolf howl, the user's audio experience will present those audio objects to the user at the respective loudspeaker locations shown at FIGS. 3-4. FIG. 4 illustrates similar to FIG. 3 but with audio object B 'moved' to avoid an adverse phase interaction, at the user's 6 degree of freedom location, between audio objects A and B. This movement is shown as a different position of the loudspeaker and the user will perceive via audio that different location of the sound object B, within the limits of human hearing for which further detail is explored below. The un-altered audio file would audibly present audio object B at the position of FIG. 3, whereas embodiments of these teachings would audibly present audio object B at the re-located position of FIG. 4.

But note that moving audio object B is a non-limiting example to illustrate the overall concept; in other implementations the scale of position adjustment may differ from that shown, or both audio objects A and B may be moved. The end goal of any of these implementations is to alter a (current or estimated) phase interaction that is deemed to be sufficiently adverse at the position of the user so that the user experience avoids that adverse phase interaction or the phase interaction is diminished as compared to no 'movement' of audio objects.

For both FIGS. 3 and 4 each audio object A and B provides a contribution to left-ear and right-ear audio rendering of the user, respectively designated $A_L$ and $A_R$ for audio objects A in both figures and FIG. 3 similarly shows audio contributions $B_L$ and $B_R$ for audio object B. At FIG. 4 audio object B has been moved from its original position for at least one audio rendering contribution in order to compensate for unwanted phase effect. For simplicity the user is assumed to be at the same position in FIGS. 3 and 4. FIG. 4 specifically illustrates two different contributions $B_R$ and $B'_R$ from the two different positions of audio object B to the user's right ear; audio contribution $B_R$ is the same as at FIG. 3 and corresponds to the audio object B positioned identically to that shown at FIG. 3, while audio contribution $B'_R$ is changed and corresponds to the audio object B after its position is changed. Audio object A at FIG. 4 is assumed to be in the same location as it is in FIG. 3 so its audio contributions $A_R$ and $A_L$ are the same. With respect to only audio object B, the audio contributions $B_R$ and $B_L$ of FIG. 3 may be considered as the default audio rendering of the audio object B to the user's respective right and left ears and the adjusted audio contributions $B'_R$ and $B'_L$ may be considered as the modified rendering of the audio object B to the user's respective right and left ears.

As detailed below, FIGS. 6A-B expand on the general principle of FIG. 4, and different use cases will dictate which specific audio components are to be phase-compensated. Relatedly, note also that in FIG. 4 the contribution $B'_L$ to the user's left ear from audio object B is different from FIG. 3; this follows from the fact that movement of audio object B along the diagonal to the user as shown in FIG. 4 will be implemented by making a phase adjustment to what the user hears in both ears. If the virtual position of audio object B is presented as audio component $B_L$ to the user's left ear and audio component $B_R$ to the user's right ear in FIG. 3, then to move that virtual position along the diagonal to the user as FIG. 4 illustrates will require presentation of a modified audio component $B'_L$ to the user's left ear and also a modified audio component $B'_R$ to the user's right ear. If the purpose of the phase adjustment is to avoid an undesirable phase interaction at the right ear but the unmodified phase interactions at the left ear are not undesirable, embodiments of these teaching may have the system restrict the virtual movement of audio object B such that changes to the left-ear contribution $B'_L$ do not create an undesirable phase interference at the user's left ear that did not exist prior to such object movement.

Note that FIG. 4 illustrates the user experiencing the 6 degree of freedom audio scene via headphones. The audio objects A and B illustrated at FIGS. 3-4 external of the user are for clarity of explanation in that the user's audio experience via the headset mimics the audio objects being at the physical locations of the loudspeakers as shown, and moving the audio object B as described is identical, from the perspective of human audio experience, to moving a loudspeaker at the location of audio object B (provided the modification is applied for both ears). Further considerations when the audio experience is implemented via loudspeakers rather than a headset is presented below with respect to FIG. 7.

In this regard, 'movement' of the audio object is implemented by altering the phase and/or wavelength (frequency) of the particular frequency component at issue. So for example if we assume audio object A is manifested by the reference signal at FIG. 1a and audio object B is manifested by the 180° shifted signal at FIG. 1f, and we further assume that the adverse phase effect at the user's location at time t for that frequency is estimated to be full cancellation as FIG. 1g illustrates, compensation may be had by shifting the phase of that frequency component of the audio object B wave at time t, and/or by changing the wavelength of that frequency component. Phase shift is preferable so as to retain fidelity to the true audio frequencies of the audio experience.

Figure 5:
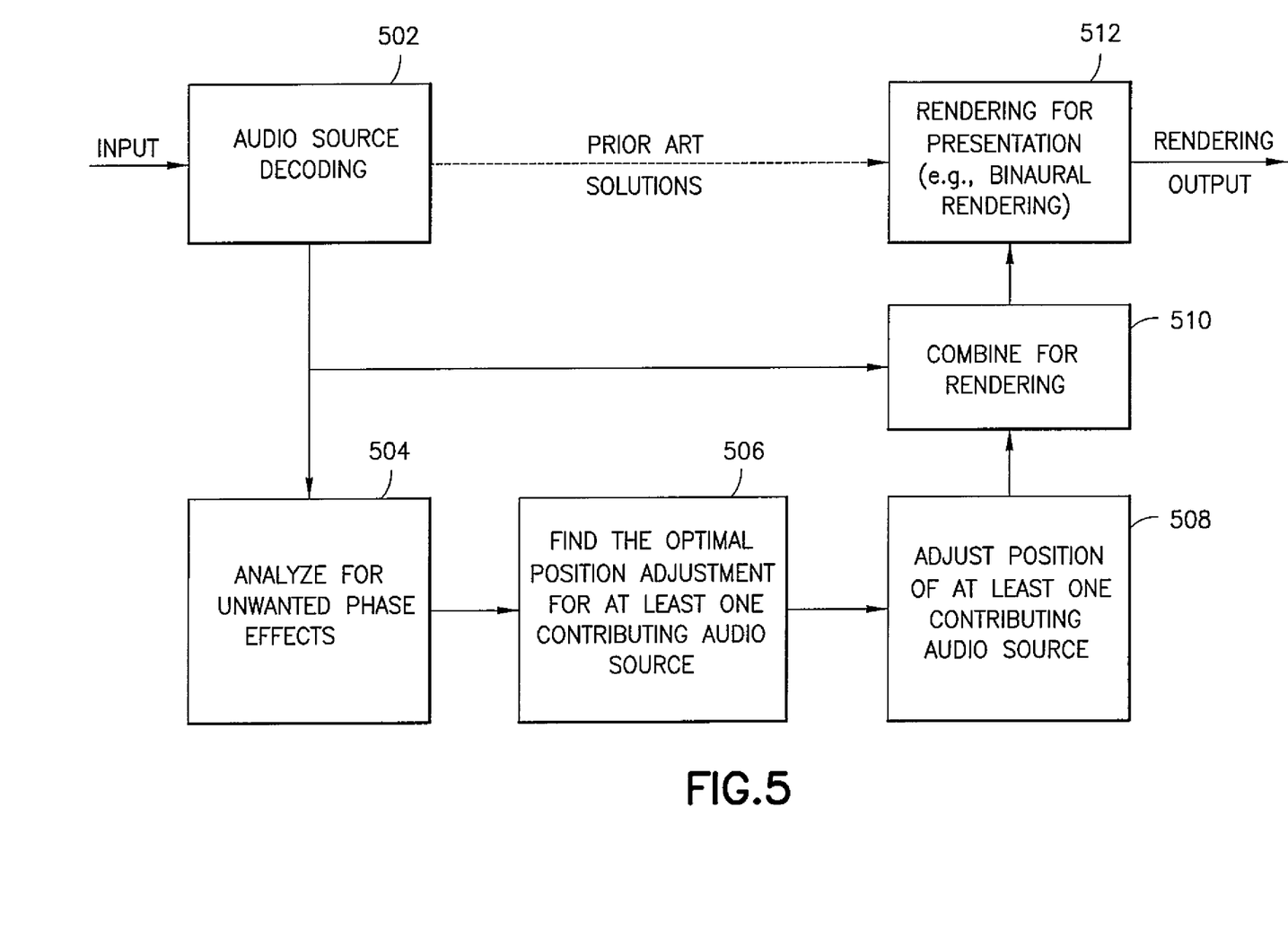
FIG. 5 is a process flow diagram illustrating certain processes according to embodiments of these teachings overlain on top of a certain prior art solution for providing a rendered audio presentation to a user.

With the above understanding of the principles by which embodiments of these teachings operate to compensate for phase effects, now FIG. 5 describes further detail as to how the system implements those principles. FIG. 5 begins with an audio input such as a pre-recorded audio retrieved from a memory or a live audio which is augmented according to these teachings, and ends with the audio rendering output to the user or users via headset(s) or loudspeakers or other implementations of audio transducers. Assuming for simplicity two audio objects A and B as FIG. 4 illustrates, FIG. 5 represents the prior art as decoding at block 502 the waveforms/metadata that is input and which defines these audio objects and rendering that at block 512 for presentation to the user(s). This prior art rendering can include down-mixing for a binaural rendering or for a specific loudspeaker configuration, augmented audio such as overlaying a live or pre-recorded track of audio objects onto some different background audio that was recorded previously at some separate location (for example, the growl of a tiger in motion added on top of non-descript jungle noises), and other common techniques mentioned above. Rendering in this regard may include determining the user's position and head orientation, and creating virtual loudspeaker signals as a binaural downmix. None of these prior art rendering techniques are seen to include phase compensation in the rendered output from block 512.

In particular embodiments of these teachings there are at least four new steps added between decoding the input at block 502 and rendering the audio output at block 512. Assume for example that the audio input to block 502 is a bitstream representing the sound objects and after decoding block 502 outputs the waveforms and associated metadata that define audio objects A and B of FIG. 4; FIG. 4 shows ear-specific components $A_L$, $A_R$, $B_L$ and $B_R$ of these waveforms which may for example be determined at the combining block 510 (or elsewhere in the processing chain). In some implementations of these teachings all of the processing described for blocks 504, 506, 508 and 510 of FIG. 5 may be done in the functional rendering block 512 but are shown as a modular-type implementation for clarity of this description. One advantage in implementing this phase effect analysis and correction functionality separately from the rendering at block 512 is that the same implementation (for example, software/firmware/chip) can be utilized with different rendering software programs that different manufacturers utilize for their respective user devices such as mobile handsets. In that regard the phase adjustment made according to these teachings may be reflected in the metadata only and implemented on the waveforms when rendered, or it may be made to the waveforms themselves prior to the rendering at block 512. The below description of FIG. 5 assumes all the waveforms/metadata are analyzed at 504 and passed through blocks 506, 508 and 510 with only corrections/adjustments made to the time slices of those audio objects exhibiting unwanted effects and the remainder passing without being adjusted; in some implementations there may be a feedback so those audio object time slices that are not to be adjusted enter the rendering block 512 directly from the decoding block 502. Since the audio objects virtually move with the user's head movements, they are evaluated and processed in FIG. 5 in slices of time.

Block 504 has analysis of the dominant audio for the purpose of detecting unwanted phase effects. As above, this can be implemented by analyzing each distinct pair of audio objects/sources for phase effect interactions at the point of the user's location to find if there is, or is estimated to be, phase effects that are sufficiently severe as to justify compensation to avoid or mitigate them. For reasons mentioned above, in some implementations this analysis may be limited only to lower frequencies, for example below 1000 Hz or below 800 Hz. Pairwise analysis is not a limiting factor to these teachings; if there are more than two audio objects/sources they may be evaluated pairwise only, or in total, or each pairwise phase profile at the user's location can then be analyzed against a next audio object/source to see if the net contribution of the accumulated audio objects/sound sources results in a phase interaction/effect sufficiently severe as to justify compensation. In this regard, user's location may be taken as roughly the midpoint between the user's ears (for most deployments where only long wavelength/low frequency waves are compensated this may be sufficiently accurate), or additional precision may be had if the user's location is taken at each of the user's ears (in which case the analysis for unwanted phase effects would be done at each ear location for each sound object pair). The threshold for this decision to compensate or not compensate will generally be implementation specific, and may even be use-case specific for example where the processing capacity of the system may be able to handle real-time processing for only up to three audio objects/sources when the correction threshold addresses a wide range of phase effects (such as employ phase cancellation of any given frequency bin of the audio signal whenever the un-modified audio wave peaks are estimated to be within 20° of one another at the user location), but can handle a higher number of audio objects/sound sources when the correction threshold is adjusted to compensate only the most severe phase effects (such as employ phase cancellation whenever the un-modified audio wave peaks are estimated to be within 10° of one another at the user location).

The output from block 504 may be considered a list of phase interactions/effects that are deemed severe enough to compensate, though in practice the different FIG. 5 blocks may be batch-processed (to create such a list) or serially processed (more typically) to deal with different severe phase interactions one after the other. Each phase interaction sufficiently severe as to require compensation is gamed/analyzed at block 506 to resolve what is to be the 'position' adjustment needed to make that phase interaction no longer severe enough to require correction. As described with reference to FIG. 4, adjusting the position of an audio object/sound source is implemented in the virtual audio environment, for example by changing phase of the relevant frequency component from audio object B or by a different change to the phases of that frequency component from both sound audio objects A and B. The frequency component may span the entire frequency bin being evaluated or only a portion of that bin. In the FIG. 4 example the decision is made to virtually adjust the 'position' of audio object B, by shifting the phase of that sound wave. As mentioned above, at this juncture of the process for certain implementations the shift may be reflected only in metadata, and the rendering block 512 implements that shift in the waveform(s). In the ideal block 506 finds the optimal virtual position adjustment, but for the time constraints and processor demands of real time audio processing it may be that a satisfactory solution (virtual position) is found at block 506 that is somewhat shy of optimal. For the unwanted phase effect being considered, block 506 determines at least one position adjustment for at least one audio object/sound source contributing to the problem phase effect. For example, certain advanced embodiments may have the direction of user movement considered in this step in order to find the audio object/sound source adjustment that minimizes the need for further temporary position adjustments. Referring to FIG. 4, for this example the position adjustment is shown as the difference between $B_R$ and $B'_R$ when the audio object B is moved. For the position adjustment found by block 506 of FIG. 5, block 508 implements that (at least one) position adjustment for example by shifting phase of the subject frequency component at the requisite time for the one or more audio objects/sound sources.

For a given severe phase interaction the output of block 508 is then for example a phase shifted version of the true wave, such as the 86° shift at FIG. 1D of the true wave of FIG. 1A which is shown conceptually in FIG. 4 as the shifted wave B' (which is rendered as binaural components $B'_R$ and $B'_L$) of the true wave B (which would have been rendered as binaural components $B_R$ and $B_L$). The audio wave A with which the un-adjusted wave B would have interfered is waiting at block 510 of FIG. 5 since it was directly input from block 502 after decoding, and is combined/multiplexed at block 510 with the adjusted audio output B' from block 508. In the combining/multiplexing of block 510, the unmodified and modified audio objects are combined in a way that makes sense for the specific implementation, so in one implementation any unmodified audio object is simply replaced by the corresponding modified object where modification has been performed, or alternatively and more simply all audio passes through blocks 504, 506 and 508 and is either is modified or not. It is this combined audio signal output from block 510 that is then rendered for presentation at block 512 and output to the audio transducers. In some implementations this combining or multiplexing of adjusted B' and un-adjusted A audio signals at block 510 further includes smoothing of the combined wave so the change from other sounds waves that are adjacent in time are less pronounced in the user experience, or for example to return the output of the combining block 512 to the combined audio without any adjustments at a specified time (e.g., returning the audio object to its default rendering position when the temporary position adjustment ends). For example, if the user movement tracking employs a prediction, this functionality may also be tied to the re-adjuster for increased smoothness or to prolong the temporary position adjustment where the actual adjustment decision is already changed back. In one particular implementation, the system of FIG. 5 runs on a frame-by-frame basis in an audio framework that may have a frame length for example of 20 ms (0.020 s). Alternatively and in addition, the position adjustment of the at least one audio object/sound source in block 508 may be carried out by a modification of the audio object metadata. In this case, the audio waveform sent to the renderer 512 may be unchanged. An advantage in this metadata-only adjustment at block 508 is that the complexity of the rendering block 512 need not increase as compared to prior art renderers since prior art renderers typically will read the audio object metadata to render that object's waveform anyway.

In a preferred embodiment the system of FIG. 5 would typically 'move' the most distant or the least audible contributing audio object/sound source farther away from the location of the user, and this is what the FIG. 4 example illustrates since $B_R$ was chosen as the wave to adjust rather than $A_R$. This is because the human auditory system has only limited possibilities to determine the distance of an audio object/sound object, as detailed above for interaural time and intensity differences. The indications for distance determination are mainly related to the close-up-range, where for example extreme level/amplitude differences may be obvious. An extreme example is very loud audio directly into only one ear. In some embodiments the position adjustment is artificially limited in cases where all contributing audio objects/sound sources are relatively close (within some predefined threshold distance) to the user. This artificial limit may in those embodiments be imposed only on audio objects/sound sources that have a relatively high frequency that needs the adjustment.

Due to this difficulty in distance determination, even if the same position modification were to be done when no phase cancellation is present it would generally not be noticeable by the user, particularly when the position movement is done smoothly. Rough indications such as loudness and audio spectrum tilt are not relevant for the small adjustments necessary to compensate for unwanted phase interactions. But it is notable that in general the human auditory system may perceive the difference (especially for a known object) of a close and a distant audio object based on the fact that the distant object/object will sound more muffled. In other words, the higher frequency waves are attenuated more quickly in the air than the lower frequencies. But as above this characteristic of human hearing is not particularly relevant for the phase compensation system described herein.

The human auditory system additionally utilizes some other cues for audio distance determination. One such cue relates to the ratio of the direct sound to the reflected sound. In a closed space this ratio may give an indication about the audio object/sound source distance, and this feature may be considered in the analyzing step 504 and the position adjustment step 506 of FIG. 5, particularly for advanced embodiments of the system. This is important because when distance is determined using sound reflectance it may be decided at block 506 to move the audio object that is nearer to the user rather than the typical choice of moving the audio object/sound source that is more distant from the user, for example when the nearer audio object/sound source is in a highly reverberant position. On the other hand, if the distant audio object/sound source is for example against a wall in the 6 degree of freedom audio scene, it may be decided to virtually move that audio object/sound source closer instead of farther away from the user in order to maintain the realism of the scene and mitigate some of the sound reflectance.

Figure 6A:
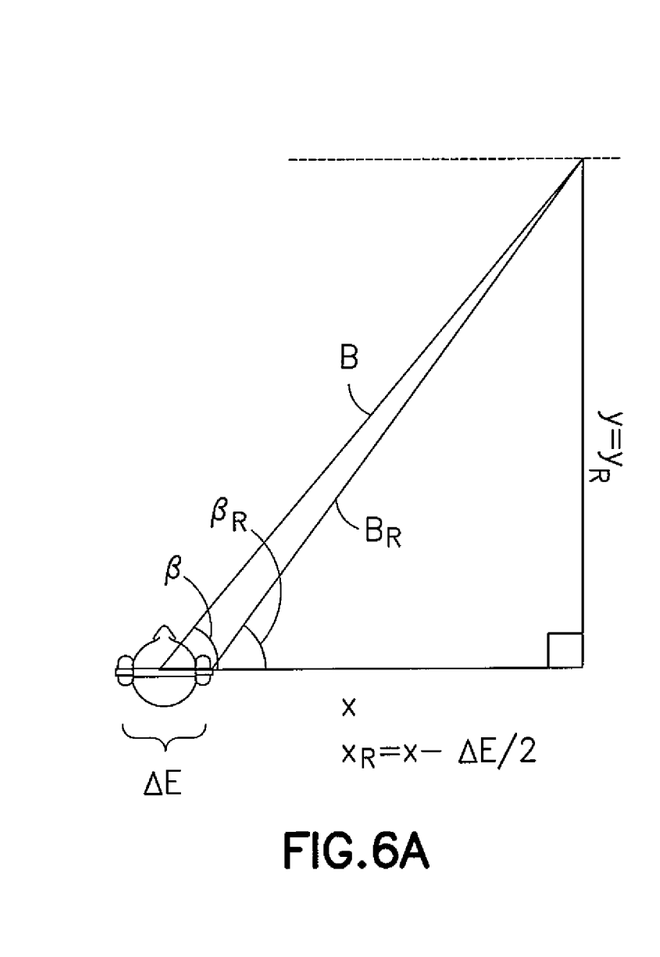
FIGS. 6A-B are schematic diagrams illustrating trigonometric relations between the user listening position and a default audio-object position at FIG. 6A and an adjusted audio-object position at FIG. 6B, according to embodiments of these teachings.
Figure 6B:
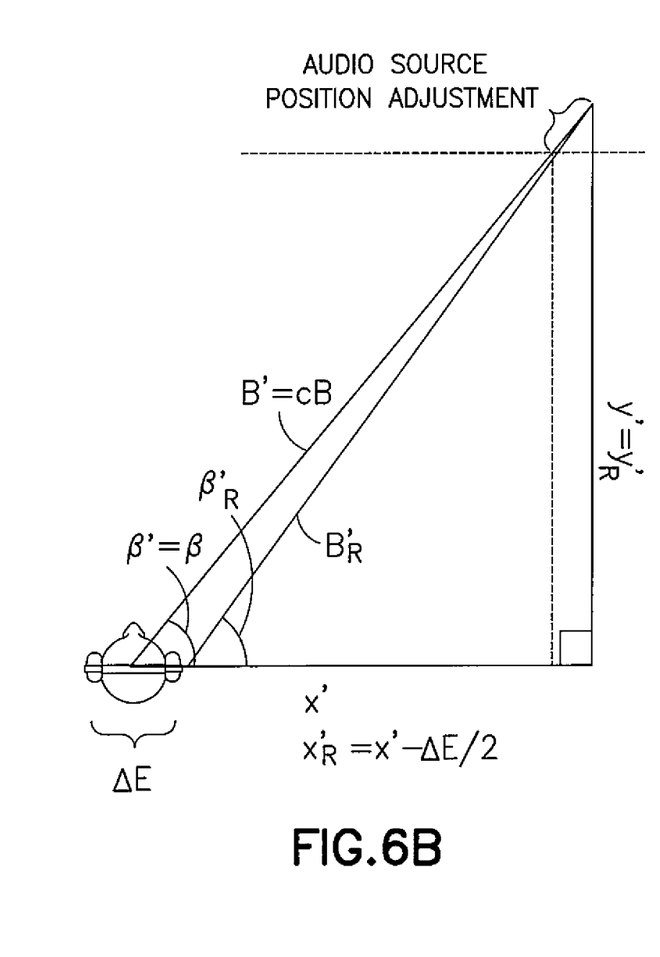

FIG. 6A-B illustrate a more thorough analysis for the position adjustment introduced at FIG. 4. As before, for simplicity of explanation assume the user position is fixed and all the audio objects are moving or movable about the user's "fixed head" in virtual space as presented audibly to the user; the reference frame will mathematically hold true for both the movable audio objects and the user's tracked translation and rotation movement. This is simply normalizing the user position and rotation and characterizing all movement as movement of the one or more audio objects/sound sources. In a preferred embodiment, the direction of the audio object relative to the user position remains unchanged and only the distance is adjusted, which results in the compensation factor applied only to the audio object distance. As detailed more fully above, any given optimization adjustment will relate primarily to the frequency or frequencies for which the compensation is made. The distance adjustment need not exactly cancel an unwanted phase effect; there typically will be a fairly rough range of distance adjustments that will result in a suitable mitigation of the unwanted phase interactions at the user's location; see for example FIGS. 1A-G for the proposition that there is a fairly wide variance from exactly the 86° phase shift at FIG. 1D that would combine with the reference wave at FIG. 1A to yield different wave combinations that are not appreciably different to the human ear. Precision may be limited in some respects by approximating the distance between a given user's ears rather than using an exact measurement, and/or by computing a probability of an unwanted phase effect at block 504 of FIG. 5 (for example if the adjustment is made on a predicted user head position or predicted range of likely positions based on the user's current position and recent movements). In this regard a range of audio object virtual position adjustments may be computed and the adjustment (phase shift) actually implemented can be selected from that range, for example based on highest probability. And while the above examples specify a particular frequency component (frequency bin or frequency band) to which the phase adjustment is applied, in some instances it may be the position (phase) adjustment is applied across the whole audio object file for a given period of time rather to only a select audio object/sound source.

FIGS. 6A-B are schematic diagrams illustrating trigonometric relations between the user listening position and a default audio-object position at FIG. 6A, and between the user listening position and an adjusted audio-object position at FIG. 6B. This illustrates how the computation of phase interference may be done, with knowledge of the frequency bin wavelengths. With reference to FIG. 4, FIG. 6A-B show only audio object B but audio object A would remain on the left-hand side of these figures. FIGS. 6A-B do not illustrate audio object A because its virtual position is not changed in that example. The distance B and the angle β are known to the audio processing system based on the tracking of the user and the audio-object properties. Also known is the distance between ears ΔE; a default value can be used with little loss of precision, or an actual/estimated value may be utilized depending on the implementation. The compensation factor c shown at FIG. 6B is found using the system described with reference to FIG. 5. All of the other relevant values may then be derived based on straightforward trigonometric functions.

Figure 7:
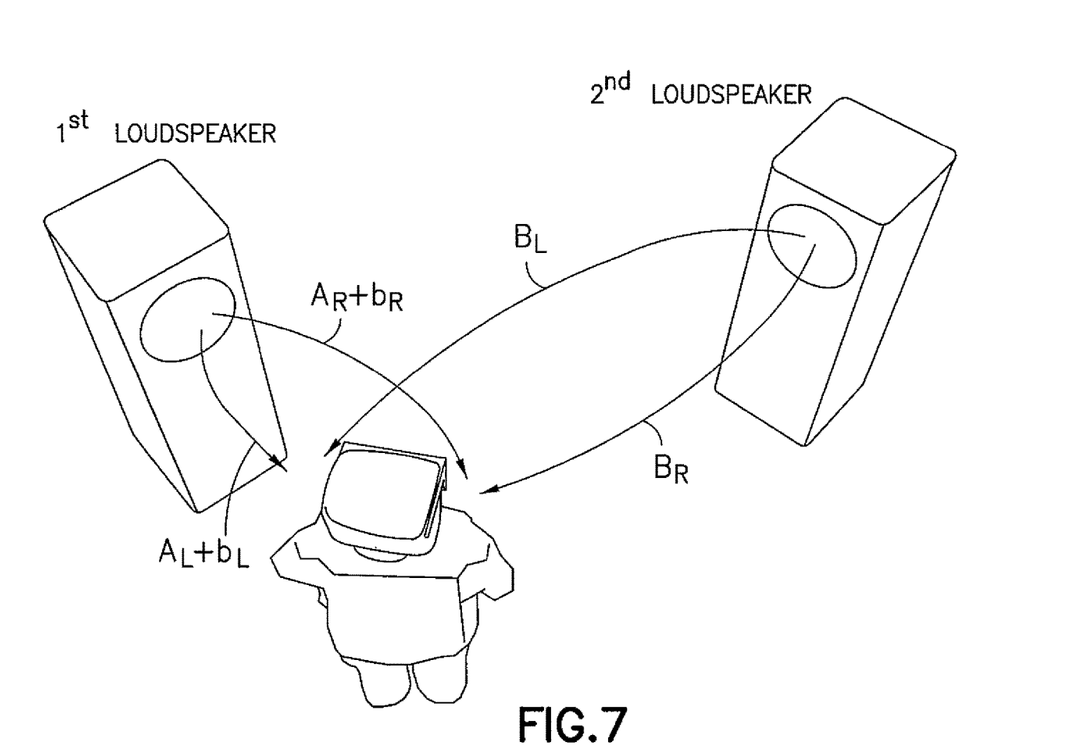
FIG. 7 is similar to FIG. 3 but where the audio presentation to the user is via loudspeakers rather than headphones.

FIG. 7 is similar to FIG. 3 except the user is not wearing headphones. Rather than audio objects A and B at FIG. 3, FIG. 7 illustrates first and second loudspeakers whose audio output jointly presents the audio objects in their spatial position relative to the user. The user position and head rotation may be tracked in such an audio environment using for example a head-mounted display (HMD) device as is known in the virtual reality arts. It is anticipated that 6 degree of freedom audio environments will typically be rendered via headphones but the loudspeaker rendering shown at FIG. 7 is also a practical option. With the loudspeaker arrangement of FIG. 7 it will be happenstance if the location of an audio object coincides with the location of a loudspeaker, and this anomaly will additionally be fleeting for the case of audio objects that move relative to the user's position in six degree space. Thus for all but very narrow circumstances that may exist only momentarily, any given sound object will be presented by the audio output of more than one loudspeaker. This is a fundamental distinction FIG. 7 illustrates over FIG. 3; the rendering of individual audio objects A and B are not considered separately in FIG. 7 for the user's two ears whereas they are in the FIG. 3 illustration. FIG. 7 illustrates this in that different audio renditions $B_R$ and $b_R$ of the audio object B are presented to the user's right ear by both loudspeakers and additionally further different audio renditions $B_L$ and $b_L$ of the same audio object are presented to the user's left ear by both loudspeakers. The audio objects may be treated for example as virtual speaker positions. Embodiments of these teachings using common compensation such as at FIG. 7 are relevant for rendering 6 degree of freedom audio to the user both via loudspeakers and via headphones, whereas embodiments using separated compensation are relevant mainly for rendering audio only via headphones. Said another way, to compensate for a phase interaction by moving the virtual position of sound object B as FIG. 4 illustrates, such compensation may be implemented using only the audio transducer of one ear-cup of a headset but in nearly all instances (exceptions noted above) will require implementation using multiple (at least two) loudspeakers.

The above examples assume the phase adjustments imposed by these teachings are directed towards retaining as much fidelity as possible to the true audio object positions while mitigating the adverse phase interactions. But in other implementations this may not be the end goal, for example the phase adjustments made by the described system may purposefully deviate from true fidelity in a substantial way when such deviations are desirable for the audio environment presented to the user. Such intentional phase distortion may be useful for less mainstream audio environments such as experimental music or certain motion picture audio particularly in the science fiction genre.

Among the various technical effects that embodiments of these teachings can provide is an overall improvement of the 6 degree of freedom audio experienced by the user. In particular, the perception of individual audio objects in the audio scene may be stabilized by removing adverse phase effects that arise from various factors, such as the type of content/audio objects that are used in professional audio productions and the mere fact that the user has free movement about the audio scene. In this regard one technical effect is overcoming a problem that relates to the change in the traditional relationship between production targets and user positioning; namely that in 6 degree of freedom audio there is no longer a sweet-spot where the user is expected to be located when listening to the audio, and even if one assumes such a sweet-spot the user may roam outside it.

In an extreme example, phase cancellation can result in a simple audio object being cancelled at least from one ear of the listener who is moving back and forth in the audio scene. Referring to the FIG. 3 audio environment the user may be experiencing the audio objects as illustrated and suddenly the $B_R$ component of audio object B is fully canceled due to an unwanted phase interaction; in this case the audio scene would present audio object B instantaneously moving from the illustrated position to a position directly to the user's left. For the user, this cancellation may appear completely random and as with this example the audio experience may be quite unrelated to any real world experience. If that example phase interaction occurs only when the user moves his head to a particular orientation then as the user moves his head into and out of this orientation the same audio object (or at least a significant frequency component of it) will be experienced as instantaneously moving back and forth as the phase-interfered component disappears and re-appear in the right-ear rendering of the audio object. Most audio renderings would seek to avoid this result, though as mentioned above the phase interaction adjustments may in certain select deployments intend such unnatural audio renderings.

Changing the object location (completely or only for the problematic frequency bin) according to the embodiments detailed herein, the disturbing effect where the audio object volume behaves unnaturally for at least one ear may be compensated without negative effects. The lack of negative effects arises from the type of modification carried out for the audio object; while the human auditory system is fairly effective at perceiving the direction of an audio object it is less capable of detecting the distance, particularly for distant objects. By applying a smoothing function to gradually integrate the phase modification, movement of the audio object from one distance to a marginally further distance from the user can eliminate or mitigate the unwanted phase effect while escaping detection by the user's auditory system. Even when it is perceptible the perceived movement will in the majority of cases not adversely affect the user's experience of the audio scene since such smoothed movements would keep the motion appearing natural. As mentioned above, some embodiments can have the system introduce phase effects to the rendering to purposefully create experimental or unnatural sound environments.

Figure 8:
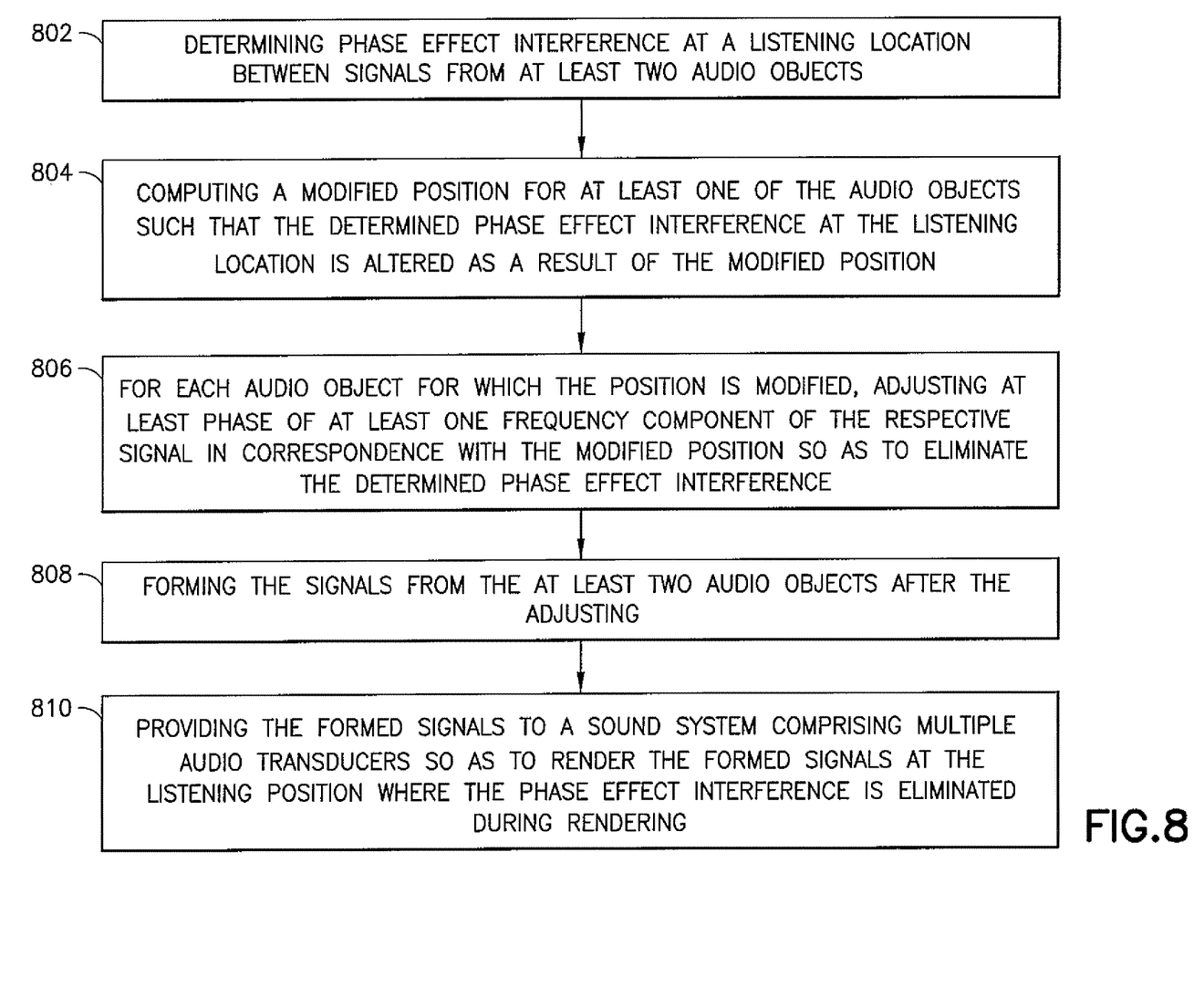
FIG. 8 is a process flow diagram summarizing certain of the teachings detailed herein.

FIG. 8 is a process flow diagram that summarizes some of the above aspects of these teachings. These steps may be performed by a single audio device that forms the audio processing system or they may be performed by multiple devices such as for example in a distributed computing environment in which different functionalities of the audio processing system are performed by different components that are not all co-located. However arranged the overall processing hardware and software forms an audio processing system. At block 802 a phase effect interference is determined at a listening location between signals from at least two audio objects. This is described more fully above with respect to block 504 of FIG. 5. As an example FIG. 8 may be applied for only one frequency bin (frequency band) while in some embodiments multiple frequency bins may be analyzed in the manner explained by FIG. 8. This may be prospective, for example when the listening location is the user's estimated location at a future time when the signals will be presented to him/her in the audio scene. With that determined phase effect interference, then at block 804 there is computed a modified position for at least one of the audio objects such that the determined phase effect interference at the listening location is altered as a result of the modified position. This is shown also at block 506 of FIG. 5, and as detailed above this altering typically will be to reduce the phase effect interference but not necessarily in all deployments of these teachings. For each audio object for which the position is modified at block 804, then block 806 adjusts at least phase of at least one frequency component of the respective signal in correspondence with the modified position so as to eliminate the determined phase effect interference. This is detailed above with respect to block 508 of FIG. 5 and is what moves the virtual position of the audio object as perceived by the user at the listening location. Block 808 has the signals from the at least two audio objects from block 802 formed after the adjusting that is done at block 806. As detailed more particularly above with respect to block 510 of FIG. 5, if the signal of only one audio object is adjusted that adjusted signal is formed along with the un-adjusted signal of the other audio object, but if the phase of both signals from both audio objects are adjusted to mitigate the unwanted phase effect then both of those signals are formed at block 808 after each such signal is adjusted. Block 510 of FIG. 5 assumes these audio signals are combined for a binaural rendering at block 512 but block 808 has these signals 'formed' which additionally covers the case in which these signals are output for storage at a computer readable memory (other than a buffer memory utilized by the rending) and accessed at a later time for the combining and binaural rendering so a user might experience the 6 degree of freedom audio scene at a time not connected to when the underlying audio bit stream was captured. Finally at block 810 the formed signals are provided to a sound system comprising multiple audio transducers so as to render the formed signals at the listening position where the phase effect interference is eliminated during rendering. In this regard sound system can mean only those audio transducers (headset speakers or loudspeakers in the above examples), or it can mean conventional audio equipment such as amplifiers, pre-amplifiers, mixers and the like disposed between the actual audio transducers and the audio processing system detailed herein that makes the phase adjustments.

Particularly for the case in which the phase interferences are to be avoided or mitigated, there may be an additional step immediately following 802 that chooses which phase effect interferences are going to be corrected. Such a step for example would select the determined phase effect interference only if the phase effect interference exceeds a threshold value, and if it does then the computing at block 804 is performed only on the selected phase effect interference, and the modified position is computed such that the determined phase effect interference at the listening location is reduced below the threshold value as a result of the modified position since the interference is specifically to be reduced in this case. When there are three or more audio objects the determining of block 804 may be performed for each pair of these three of more audio objects that have a component within the frequency bin being analyzed.

In the above examples providing of the formed signals at block 810 is for audio presentation in an audio scene in which the listening location has six degrees of freedom of movement with respect to the at least two audio objects. In this regard the steps of FIG. 8 may be repeated for a first and a second listening location corresponding to respective left and right ears of a user if that additional precision is deemed worth the added computational costs. As mentioned above, these first and second listening locations may be obtained from a head-mounted display since the six degrees of freedom mean the user/listening locations are not fixed.

In certain embodiments to limit the computational burden the steps of FIG. 8 may be executed independently across multiple defined frequency bins, where the audio processing system is configured to limit the audio frequency bins considered such that none exceed, e.g., 1000 Hz. In this regard the frequency component for which at least phase is adjusted at block 806 may span the entire frequency bin or only a portion of it. Another way to ease the computational burden is to write the controlling software such that the computing at block 804 normalizes positions of the audio objects as well as the modified position or positions to the listening location.

Figure 9:
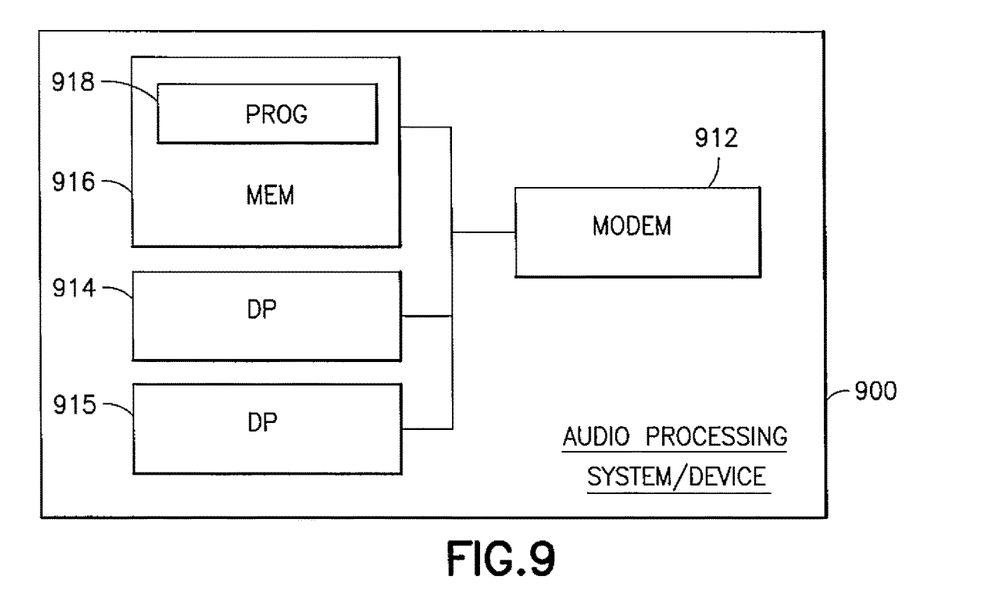
FIG. 9 is a high level schematic block diagram illustrating an audio processing apparatus/device suitable for practicing certain of these teachings.

FIG. 9 is a high level diagram illustrating some relevant components of an audio processing device or system 900 that may implement various portions of these teachings. The audio processing device/system 900 includes a controller, such as a computer or a data processor (DP) 914 (or multiple ones of them), a computer-readable memory medium embodied as a memory (MEM) 916 (or more generally a non-transitory program storage device) that stores a program of computer instructions (PROG) 918, and a suitable interface 912 such as a modem to the audio transducers that actually produce the sound from the combined signal. In general terms the audio processing device/system 900 can be considered a machine that reads the MEM/non-transitory program storage device and that executes the computer program code or executable program of instructions stored thereon. While the entity of FIG. 9 is shown as having one MEM, in practice each may have multiple discrete memory devices and the relevant algorithm(s) and executable instructions/program code may be stored on or across several such memories. The source files that embody the audio objects may be stored on the same MEM 916 as the executable PROG 918 that implements these teachings or on a different MEM.

The PROG 918 is assumed to include program instructions that, when executed by the associated one or more DPs 914, enable the system/device 900 to operate in accordance with exemplary embodiments of this invention. That is, various exemplary embodiments of this invention may be implemented at least in part by computer software executable by the DP 914 of the audio processing device/system 900; and/or by hardware, or by a combination of software and hardware (and firmware). Note also that the audio processing device/system 900 may also include dedicated processors 915. The electrical interconnects/busses between the components at FIG. 9 are conventional and not separately labelled.

The computer readable MEM 916 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 914, 915 may be of any type suitable to the local technical environment, and may include one or more of general purpose computers, special purpose computers, microprocessors, digital signal processors (DSPs), audio processors and processors based on a multicore processor architecture, as non-limiting examples. The modem 912 may be of any type suitable to the local technical environment and may be implemented using any suitable communication technology.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   determining phase effect interference at a listening location between signals from at least two audio objects;
   reducing the determined phase effect interference, where the reducing comprises modifying position of at least one and up to all of the at least two audio objects, where the modifying comprises performing at least the following:
   determining a modified position for at least one of the at least two audio objects such that the determined phase effect interference at the listening location is reduced as a result of the modified position; and
   for each audio object for which its position is to be modified, adjusting at least one frequency component of the audio object's respective signal in order to move a position of the audio object toward the modified position so as to reduce the determined phase effect interference at the listening location;
   combining the signals from the at least two audio objects after the reducing the determined phase effect interference has been performed; and
   providing the combined signals to a sound system comprising multiple audio transducers so as to render the combined signals at the listening location.

2. The method according to claim 1, the method further comprising:
   selecting the determined phase effect interference when the phase effect interference exceeds a threshold value,
   wherein the determining of the modified position is performed on the selected phase effect interference, and the modified position is determined such that the determined phase effect interference at the listening location is reduced below the threshold value as a result of the modified position.

3. The method according to claim 2, wherein there are at least three audio objects and the determining of the phase effect interference is performed for each pair of the at least three audio objects, and the selecting of the determined phase effect interference comprises selecting at least one phase effect interference determined for the pairs of the at least three audio objects.

4. The method according to claim 1, wherein the combined signals are provided for audio presentation in an audio scene in which the listening location has six degrees of freedom of movement with respect to the at least two audio objects.

5. The method according to claim 4, wherein the method is repeated for a first and a second listening location corresponding to respective left and right ears of a user.

6. The method according to claim 5, wherein the first and second listening locations are obtained from a head-mounted display.

7. The method according to claim 1, wherein the method is executed across multiple defined frequency bins, none of which exceed 1000 Hz.

8. The method according to claim 1, further comprising normalizing positions of the audio objects and the modified position to the listening location.

9. A non-transitory computer readable memory tangibly storing computer program instructions that, when executed with one or more processors, cause a host audio system to perform the method of claim 1.

10. The method according to claim 1, wherein the adjusting the at least one frequency component of the audio object's respective signal adjusts a phase of at least one audio component of the audio object's respective signal that results in a movement in the position of the audio object toward the modified position.

11. An audio processing system comprising:
   at least one non-transitory memory storing computer program instructions, and
   at least one processor;
   wherein the at least one non-transitory memory with the computer program instructions is configured with the at least one processor to cause the audio processing system to perform actions comprising:
   determine phase effect interference at a listening location between signals from at least two audio objects;
   reduce the determined phase effect interference, where the reducing comprises modifying position of at least one and up to all of the at least two audio objects, where the modifying comprises performing at least the following:

determine a modified position for at least one of the at least two audio objects such that the determined phase effect interference at the listening location is reduced as a result of the modified position; and for each audio object for which its position is to be modified, adjust at least one frequency component of the audio object's respective signal in order to move a position of the audio object toward the modified position so as to reduce the determined phase effect interference at the listening location;

combine the signals from the at least two audio objects after the reducing the determined phase effect interference has been performed; and provide the combined signals to a sound system comprising multiple audio transducers so as to render the combined signals at the listening location.

12. The audio processing system according to claim 11, the actions further comprising:

select the determined phase effect interference when the phase effect interference exceeds a threshold value, wherein the determining of the modified position is performed on the selected phase effect interference, and the modified position is determined such that the determined phase effect interference at the listening location is reduced below the threshold value as a result of the modified position.

13. The audio processing system according to claim 12, wherein there are at least three audio objects and the determining of the phase effect interference is performed for each pair of the at least three audio objects, and the selecting of the determined phase effect interference comprises selecting at least one phase effect interference determined for the pairs of the at least three audio objects.

14. The audio processing system according to claim 11, wherein the combined signals are provided for audio presentation in an audio scene in which the listening location has six degrees of freedom of movement with respect to the at least two audio objects.

15. The audio processing system according to claim 14, wherein the actions are repeated for a first and a second listening location corresponding to respective left and right ears of a user.

16. The audio processing system according to claim 11, wherein the actions are performed across multiple defined frequency bins, none of which exceed 1000 Hz.

17. The audio processing system according to claim 11, wherein the actions further comprise normalize positions of the audio objects and the modified position to the listening location.

18. The audio processing system according to claim 11, wherein the adjusting the at least one frequency component of the audio object's respective signal adjusts a phase of at least one audio component of the audio object's respective signal that results in a movement in the position of the audio object toward the modified position.

19. An audio processing system comprising:

at least one non-transitory memory storing computer program instructions, and at least one processor;

wherein the at least one non-transitory memory with the computer program instructions is configured with the at least one processor to cause the audio processing system to perform actions comprising:

determine phase effect interference at a listening location between signals from at least two audio objects;

reduce the determined phase effect interference, where the reducing comprises modifying position of at least one and up to all of the at least two audio objects, where the modifying comprises performing at least the following:

determine a modified position for at least one of the at least two audio objects such that the determined phase effect interference at the listening location is reduced as a result of the modified position; and for each audio object for which its position is to be modified, adjust a position of the audio object in order to move the audio object toward the modified position so as to reduce the determined phase effect interference at the listening location;

combine the signals from the at least two audio objects after the reducing the determined phase effect interference has been performed; and provide the combined signals to a sound system comprising multiple audio transducers so as to render the combined signals at the listening location.

20. The audio processing system according to claim 19, wherein the adjusting the position of the audio object causes a corresponding adjustment in a phase of at least one audio component of the audio object's respective signal that results in a movement in the position of the audio object toward the modified position.

* * * * *